United States Patent [19]

Moriya

[11] 4,162,721
[45] Jul. 31, 1979

[54] SLIDING CALIPER TYPE DISC BRAKE

[75] Inventor: Michio Moriya, Toyonaka, Japan

[73] Assignee: Sumitomo Electric Industries, Ltd., Osaka, Japan

[21] Appl. No.: 818,516

[22] Filed: Jul. 25, 1977

[30] Foreign Application Priority Data

Jul. 28, 1976 [JP] Japan .................. 51-101601[U]
Mar. 3, 1977 [JP] Japan .................. 52-23436
Apr. 14, 1977 [JP] Japan .................. 52-47608[U]

[51] Int. Cl.² ........................................... F16D 65/02
[52] U.S. Cl. ............................ 188/73.3; 188/73.1; 188/73.5
[58] Field of Search ............... 188/71.1, 72.4, 73.3, 188/73.5, 73.6, 205 A, 73.1, 72.3, 72.5, 250 B, 250 F

[56] References Cited

U.S. PATENT DOCUMENTS

| 3,375,906 | 4/1968 | Hayes | 188/73.3 |
| 3,493,084 | 2/1970 | Maurice | 188/205 A |
| 3,920,104 | 11/1975 | Hoffman | 188/73.3 |
| 3,930,564 | 1/1976 | Kobayashi et al. | 188/73.3 |
| 3,942,611 | 3/1976 | Burnett | 188/73.3 |
| 4,027,750 | 6/1977 | Kawamoto et al. | 188/73.3 |
| 4,042,074 | 8/1977 | Ishihara | 188/73.3 |
| 4,044,864 | 8/1977 | Karasudani | 188/73.3 |
| 4,068,743 | 1/1978 | Karasudani et al. | 188/71.1 |
| 4,074,795 | 2/1978 | Kondo et al. | 188/73.3 |

FOREIGN PATENT DOCUMENTS

| 2514383 | 11/1975 | Fed. Rep. of Germany | 188/73.3 |
| 2547170 | 5/1976 | Fed. Rep. of Germany | 188/73.3 |
| 2649843 | 5/1977 | Fed. Rep. of Germany | 188/73.6 |
| 1373760 | 8/1964 | France | 188/73.3 |
| 1382046 | 1/1975 | United Kingdom | 188/73.3 |

Primary Examiner—Edward R. Kazenske
Attorney, Agent, or Firm—Carothers and Carothers

[57] ABSTRACT

The present invention relates to an improvement on a floating spot type disc brake in which the caliper slides in the disc axial direction. The brake has a U-shaped arm of the torque member that extends to the outer circumferential part of the disc from one side of the rotatable disc which is to be braked. Bush boots of an elastic material are provided between the penetrating holes provided in the disc axial direction in the U-shaped arms of the torque member which is fixed to a non-rotating part and the slide pin parts provided on the other hand in the caliper member which straddles over the outer circumference of the disc and is slidable in the disc axial direction. A bush dust boot which is capable of freely expanding and contracting in the axial direction is provided at the root of this bush boot attached to the caliper member and a small aperture is provided at the other end to enable air to come in and go out when the slide pin moves in this boot while preventing the entry of foreign bodies from outside. Pad retainers which engage elastically with the torque member, caliper member and friction pads contained in the torque member is provided.

12 Claims, 7 Drawing Figures

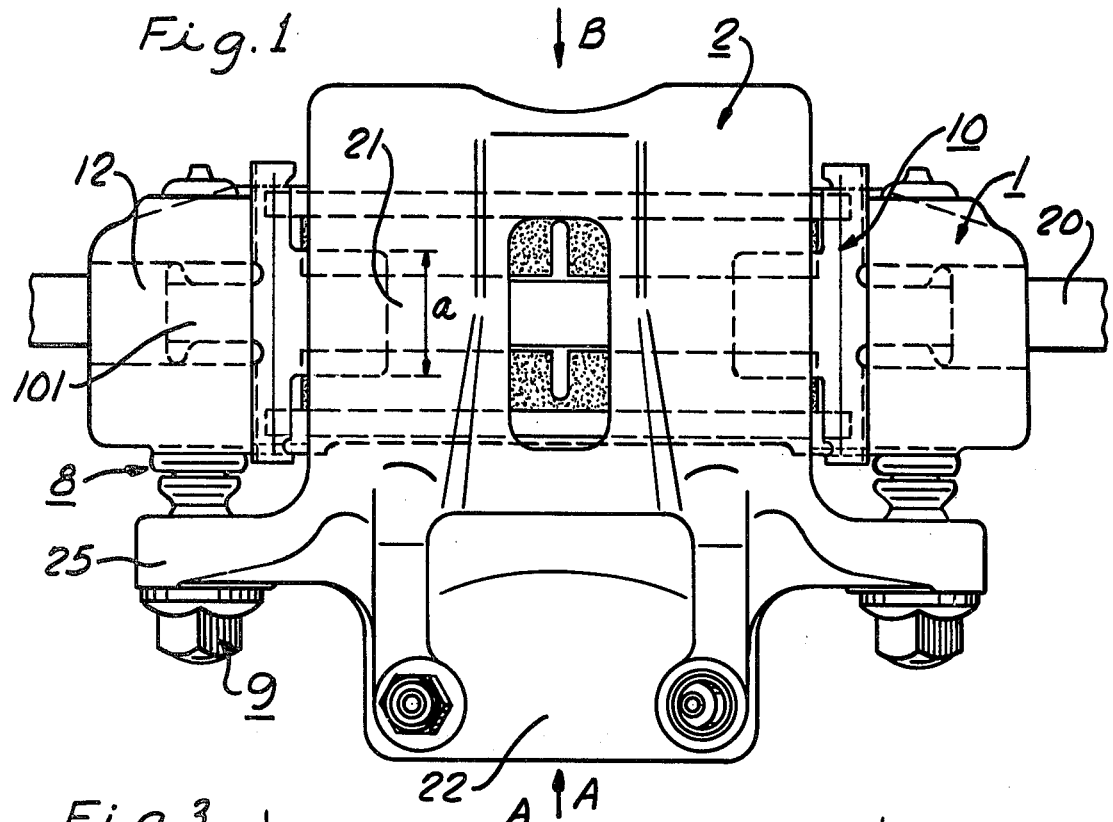
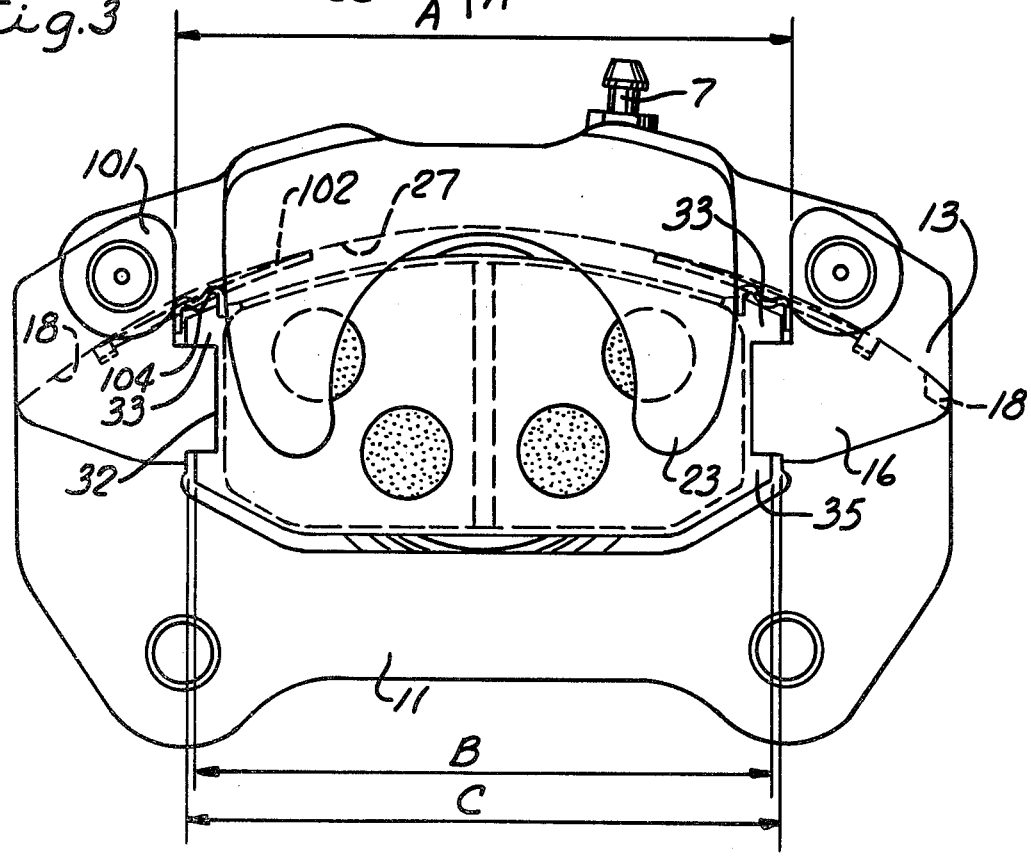

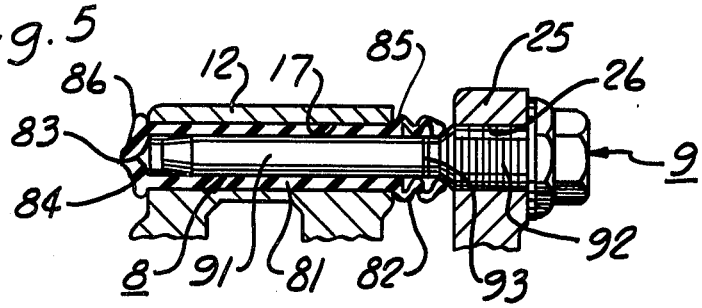
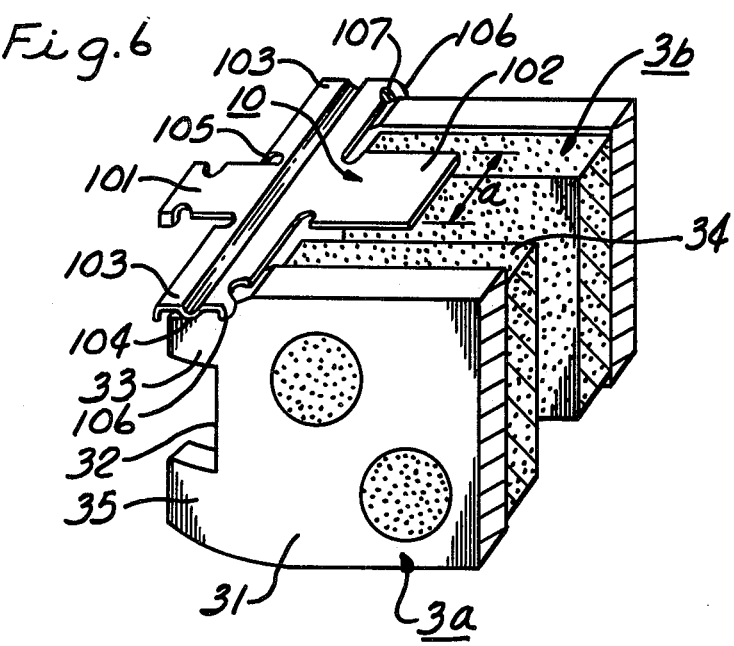
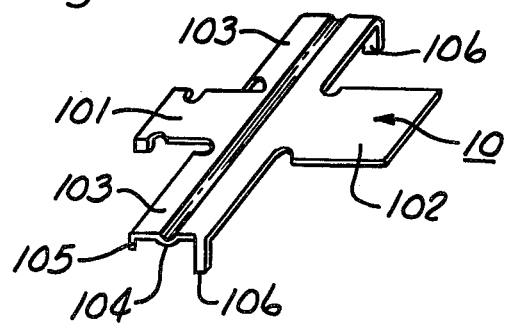

SLIDING CALIPER TYPE DISC BRAKE

BACKGROUND OF THE INVENTION

1. Field of Invention

The present invention relates generally to sliding caliper type disc brakes. With a disc brake of the sliding caliper type which has a caliper member supported by a slide pin which moves through the guide hole, a dust boot is provided in order to prevent dust and other matter from entering the hole through which the slide pin moves and to prevent rusting from occurring therein. On the other hand, if air is closed in the hole when the slide pin moves in the hole, this makes it difficult for the slide pin to slide freely.

The present invention solves these problems in a simple way.

2. Discussion of Prior Art

According to British Pat. No. 1,382,046, the disc brake of the pin sliding caliper type is, just as in the case of the present invention, provided with a boot for the purpose of preventing dust from finding its way between the slide pin and the hole which engages with it. Furthermore, a separate part is provided for the purpose of enabling air to go into and come out of the hole. However, this results in an increase in the number of parts required and is not economical.

According to the present invention, a bush of an elastic material is inserted between the slide pin and the guide hole in order to alleviate the tolerance in manufacturing precision with regard to distance and parallelism between the pin and hole and also to assure an elastic engagement between the caliper member and the torque member for preventing their breakage through violent collision and eliminating collision noise.

Furthermore, a boot is provided in one body with the bush at one end thereof for preventing the entry of dust, and at the same time a small aperture which is usually closed is provided at the other end for making it easier to remove air from the guide hole while preventing entry of dust through the small aperture.

In addition, the small aperture, boot and bush are made in one body, so that the number of parts required is small and it is economical.

SUMMARY OF THE INVENTION

This invention relates to a disc brake which has a caliper supported by a pair of slide pins which are guided slidably in holes provided in the disc axial direction in the torque member of the disc brake. For the purpose of effecting smooth guidance, each slide pin is covered with a bush made of an elastic material. At one end of this bush is provided integrated with it a boot which is freely expandable and contractible in the axial direction, while the other end of this bush is provided a small aperture which is made gradually thinner towards the outside and is usually closed, the construction being a simple construction that enables the slide pin to slide in the bush smoothly while preventing the entry of dust.

BRIEF DESCRIPTION OF THE DRAWINGS

FIG. 1 is a plan view of a disc brake which is an example embodiment of the prevent invention.

FIG. 3 is a back view of the disc brake shown in FIG. 1 as viewed from arrow B. For the sake of convenience in explanation, FIGS. 2 and 3 show views with the disc removed.

FIG. 5 is a partial sectional view along V—V in FIG. 2.

FIG. 6 is a slant view depicting slantwise the friction pads and pad retainer engaging with them of the disc brake shown in FIGS. 1-3.

FIG. 7 is a slant view showing another example of embodiment of the pad retainer shown in FIG. 6.

DETAILED DESCRIPTION OF THE PREFERRED EMBODIMENT

Figure 2:
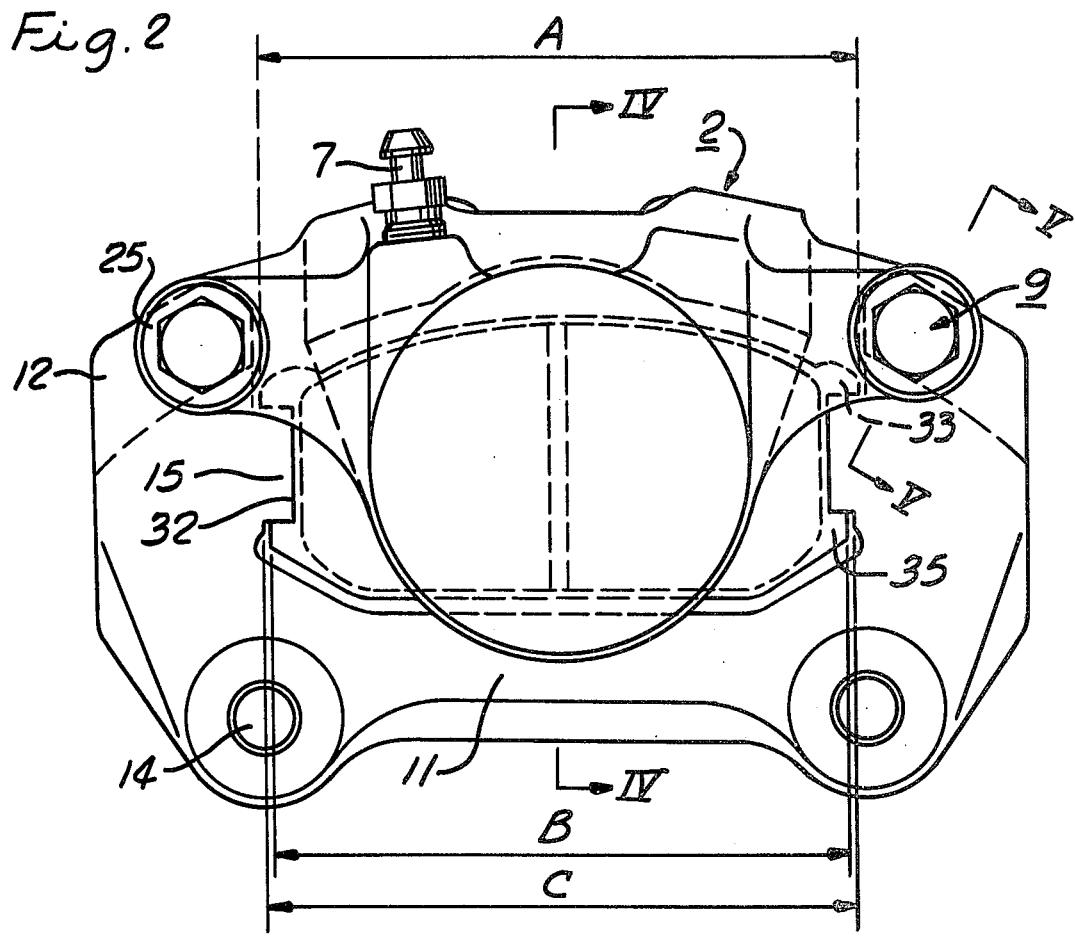
FIG. 2 is a front view of the disc brake shown in FIG. 1 as viewed from arrow A.

This invention relates to a pin sliding caliper type disc brake. In the case of a pin sliding caliper type disc brake heretofore in use, it is so constructed that the caliper member which bears the friction pads provided for engagement with the two faces of the brake disc opposed to them respectively in the axial direction is supported in a mutually slidable manner directly on the torque member fixed to the frame, for example, of the vehicle. This caliper member contains a pressing mechanism consisting of a hydraulic cylinder and piston positioned to engage a friction pad directly onto one side of the brake disc, the caliper member being caused to slide on the torque member by the force of reaction generated by said engagement thereby to engage the friction pad on the other side of the brake disc with the braking surface of the disc opposed to it.

In order to provide the requisite slidable connection between the caliper member and the torque member in a brake of this type, in an instance of the conventional types, a guide groove part engaging relatively with the torque member and the caliper member and an auxiliary device for their engagement are provided, the caliper member being thereby slidably connected to the torque member. In this case, however, it is difficult to take a preventive measure against the rusting and sticking of the sliding parts at the time the brake is in use, and there are difficulties in manufacturing and in operation. In another instance of the conventional type, a pair of fixing pins positioned apart in the circumferencial direction, which are borne on the caliper member or torque member, are often used, and the pins are engaged with openings provided on the torque member or caliper member for containing these pins. However, as strict manufacturing tolerances are required with respect to the dimensions and positions of the pin and opening in order to ensure a good slidable engagement of the caliper member with the torque member, such a measure for example as interposing a rubber bush between the pin and the pin hole on one of the pins is suggested, but it is at any rate necessary to provide a dust boot or the like between the pin and the pin attaching part as a means to prevent the rusting and sticking of the slidable portion of the pin. This causes difficulty in manufacturing or in operation.

The present invention provides an inexpensive and dependable pin sliding caliper type disc brake which consists of a torque member fixed to the frame or other similar part of a vehicle, friction pads slidable in the torque member only in the axial direction of the disc and positioned on either side of the disc, and a caliper member containing a piston to move the firction pads into braking engagement with the brake disc through the guidance of a pair of pins having bushes interposed with respect to the torque member.

According to the present invention, the caliper member containing the piston is slidably guided by a pair of bush boots which completely shield a pair of slide pins positioned on the caliper member or torque member and guide holes positioned on the torque member or caliper member from the outside atmosphere, this resulting in an advantage with respect to the rusting and sticking of the pins and making it unnecessary to use such structural parts as the auxiliary engaging device by groove sliding means or the independent dust boot of the pin sliding means used in some instances heretofore. In addition, it is made possible to minimize the machining and assembling work of the torque member and caliper member on which such parts would be positioned. In consequence, the present invention brings about great advantages in manufacture and in operation.

Furthermore, according to the present invention, the friction pads on both sides of the disc are guided and caught by the torque receiving portions which also are located on both sides of the disc respectively and protrude towards the friction pad, so that the friction pads are prevented by a simple structure from flying out in the axial direction of the disc even when they engage with the revolving disc and receive torque and centrifugal force.

In the case of the disc brake according to the present invention, there are two ways of replacing the friction pad with a new one. The first method is as follows: First, remove one slide pin of the pair of slide pins, turn the caliper member around the other of the slide pins as a center to obtain space for replacing the friction pad, and then replace the friction pad. The other way is as follows: Remove both slide pins of the pair, remove the caliper member from the torque member, and then replace the friction pad. Either of these ways will do.

Now, explanation will be given referring to the attached drawings which show an example of embodiment of the present invention. In all of the drawings the same reference numeral is given to a part having a similar function.

Figure 4:
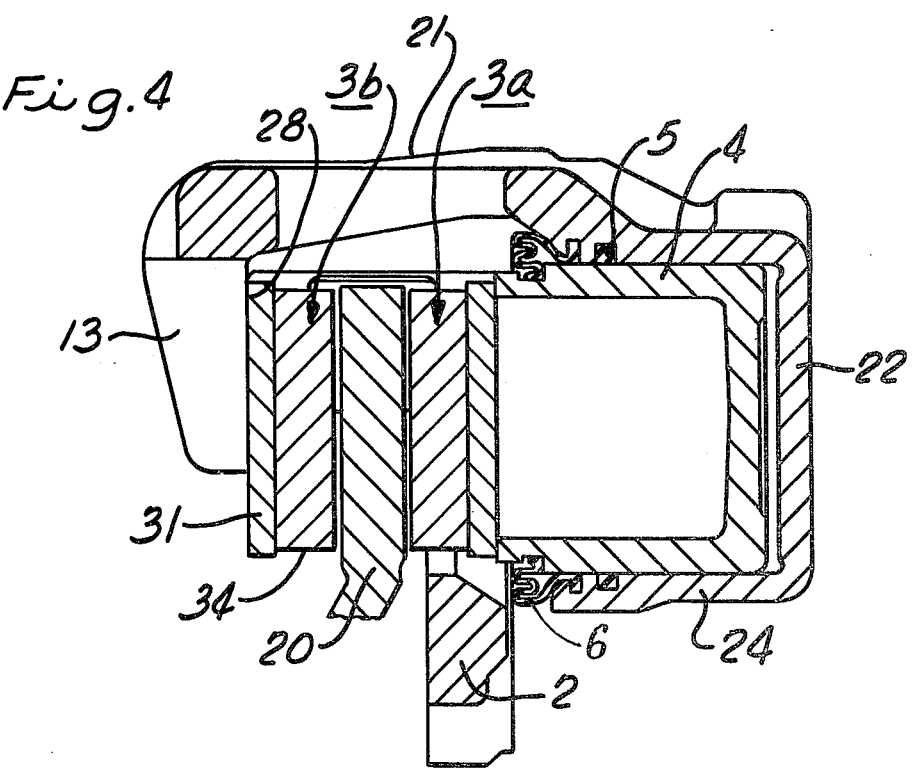
FIG. 4 is a sectional view along IV—IV in FIG. 2, the disc not being removed in this Figure.

In the sliding caliper type disc brake shown in FIGS. 1–7, the torque member 1 has a connecting part 11 which extends in the circumferential direction on one side of the brake disc 20, and that part connects a pair of U-shaped arms 12 which are separated in the disc circumferential direction and straddle over the disc, the arms extending beyond the outer circumference of the brake disc and terminating in end parts 13 extending inwards in the disc radial direction on the other side of the brake disc 20. The torque member 1 is fixed to the frame or the like of the vehicle, which is not shown in the drawings, by means of its installation holes 14 and screws or the like. The about U-shaped caliper member 2 has an inside arm 22 and outside arm 23 connected by the crown part 21 in the axial direction and extending in the radial direction. The crown part 21 is located between the U-shaped arms 12 of the torque member 1 and the inside arm 22 bears the friction pad 3a capable of engaging with one of the braking faces of the brake disc 20, while the outside arm 23 bears the friction pad 3b capable of engaging with the other braking face of the brake disc. Integrally with the inside arm 22 is formed the fluid pressure cylinder 24 and the cylinder is provided, as shown in FIG. 4, with the piston 4 and piston seal 5 for the purpose of holding fluid pressure, the dust boot 6 for the purpose of preventing the entry of foreign bodies into the cylinder, and the bleeder 7 for the purpose of removing air in the liquid. The cylinder 24 moves the piston 4, which is capable of displacement in response to fluid pressure in the cylinder, and displaces the friction pad 3a into direct engagement with the brake disc. The caliper member 2 is floated relative to the torque member 1 by the force of reaction of the friction pad 3a engaging with the brake disc, and thereby causes the friction pad 3b to engaged with the face on the other side of the brake disc.

In order to let the friction pads 3a, 3b slide in engagement in the torque member 1 in the axial direction of the brake disc, the arm part 12 and end part 13 of the torque member are provided respectively with the torque receiving parts 15, 16 which receive the braking torque, and the friction pads 3a, 3b are provided in both end parts of their backing plates 31 with a groove 32 which engages relatively with them.

In order to engage the caliper member 2 containing the piston 4 with the torque member 1, the torque member 1, as shown in FIG. 5, is provided with a pair of penetrating holes 17 in the disc axial direction in its U-shaped arm part 12 and a bush boot 8 made of an elastic material is placed in it, while the caliper member 2 is provided on both sides of its cylinder 24 part with a pair of lugs 25 and installation holes 26 for slide pins, the guide portion 91 of the slide pin 9 being inserted into the bush part 81 of the bush boot 8 and the slide pin being fixed in the slide pin installation hole 26 by means of the bolt part 92. In this case, as shown in FIG. 5, the bush boot 8 is made in one body having one of its ends of the bush part 81 in the inside arm part 22 of the caliper 2 terminate in a freely expandable and shrinkable dust boot 82 engaged with the boot stop 93 of the slide pin 9 for the prevention of entry of dust onto the guide portion surface 91 of the guide pin, while the other end in the outside arm part 23 terminates in a closed end 84 to prevent entry of foreign bodies, and which is made of an elastic body having a small normally closed aperture 83 which is normally closed by the elasticity of the body but is open when the air inside is pressurized by the movement of the sliding pin 9 to thus preclude the air pump phenomenon that would occur at the time the slide pin 9 is inserted, while preventing ingress of foreign bodies. Both ends are further provided with a stop flange 85, 86 which prevents detachment from the penetrating hole 17 of the torque member 1. Although the torque member 1 is provided with the bush boot 8 and the caliper member 2 with the slide pin 9 in this example of embodiment, it is obvious that the same effect will be obtained by reversing their relative relationship and providing the torque member 1 with the slide pin 9 and the caliper member with the bush boot 8. That is to say, in the case of a pin sliding caliper type disc brake according to the present invention, the connecting of the caliper member 2 with the torque member 1 is effected via a pair of bush boots 8 made of an elastic material and pin bolts 9, and furthermore their sliding parts are isolated from outside atmosphere, even while the friction pads 3a, 3b are being replaced, so that there will be no problem of the rusting and sticking of the sliding parts of the torque member and caliper member and the structural parts required are few. Thus the present invention provides a brake which is inexpensive and easy to manufacture and is of an excellent performance.

In this example of embodiment, a pad retainer 10 made of an elastic sheet of the shape of a cross is also provided for the purpose of preventing vibration due to the existence of engagement clearances in the caliper member 2 containing friction pads 3a, 3b and the piston 4 at the time the brake is applied. By the spring force are engaged one end part 101 of pad retainer with the groove 18 for brake disc inside of the U-shaped arm part of the torque member, the other part 102 with the groove 27 for brake disc of the caliper member and the crest parts 104 of the wing parts 103 with the upper lugs 33 provided on the backing plates 31 of the friction pads 3a, 3b, thus preventing the occurrence of noise due to the vibration of caliper member 2 and others throughout the whole period during which the friction material of the friction pads 3a, 3b is in use. For the prevention of detachment of the pad retainer 10 in the circumferential direction of the brake disc, the lugs 105 provided in the wing part 103 of the pad retainer 10 are caught by the U-shaped arm 12 of the torque member and the upper protrusions 33 of the friction pads 3a, 3b, and for the prevention of detachment in the axial direction of the brake disc, the end part 101 of the pad retainer 10 is caught by the groove 18 for brake disc of the torque member. If the resilient force of this pad retainer 10 is selected suitably, the caliper member 2 including the piston 4 will have an appropriate sliding resistance to the torque member 1 via the pad retainer 10, this bringing about an effect that the shake back experienced when braking a vehicle or the like is decreased. Furthermore, if the width dimension "a" or shape of the end part 102 shown in FIG. 1 or FIG. 6 of the pad retainer 10 is selected suitably, the backing plates 31 of the friction pads 3a, 3b approach this end part 102 as the friction material 34 wears out, so that it is possible to detect the wear limit of the friction material.

A claw 106 which is an object of the present application is provided at either end of the wing part 103. This claw 106 is formed by making a cut 107 in the wing part at a position just opposite to the back of the backing plate 31 of the pad which does not face the brake disc and bending the portion outside of this cut along the backing plate 31. Or, this claw may be formed, as shown in FIG. 7, by bending a partial extension of the wing part 103 onto the backing plate. That is to say, the backing plate 31 of the pad comes in contact with this claw and prevents the pad 3a or 3b from being removed from the torque member 1 of the fixed member in the direction farther from the disc 20.

In the present example of embodiment, it is so arranged that the possibility of installing the friction pads 3a, 3b upside down by mistake is eliminated. That is to say, as clearly shown in FIG. 2 and FIG. 3, the torque receiving parts 15, 16 of the torque member are engaged with the grooves 32 provided on both sides of the pad and it is so designed that space distance C of the torque member for insertion of the lower ears 35 of the pad is smaller than the distance A between the upper ears 33 of the pad. To eliminate the possibility of installing the pads upside down by mistake, the object may be attained also by designing conversely that, referring to FIG. 2, the width B of the lower ears 35 of the pad is made larger than the space distance of the torque member where the upper ears 33 having a distance A are to be inserted, so that insertion therein is made impossible. In this case, however, the space distance C of the torque member becomes still larger and the strength of the joint root of the U-shaped arm 12 on the torque member to receive the torque generated in the pad at the time the brake is applied becomes less. Therefore, this design is not advantageous.

I claim:

1. A sliding caliper type disc brake comprising, a brake disc which is capable of rotation, a torque member which is fixed to the frame of the vehicle or another similar part of the vehicle and which has circumferentially spaced torque receiving parts on both sides of the disc respectively, friction pads which are coupled with said torque receiving parts and guided so as to be mutually slidable on said torque receiving parts to permit frictional braking engagement of said pads to opposite sides of said disc, and a caliper member which straddles over the outer circumference of said disc and is operable to move said friction pads into braking engagement with said disc, said caliper slidably guided with respect to said torque member by a pair of pins connected to and extending from one of said members and slidably received in corresponding guide holes penetrating through the other of said members, the improvement comprising a pair of bush boots of an elastic material seated in and lining said guide holes and normally closed at one end thereof for respectively slidably receiving said pins therein and normally closing off the free ends of said pins from the exterior atmosphere, said bush boots having integral dust boots at the other ends thereof which freely expand and contract between said members to close off said pins from the exterior atmosphere at their ends of extending connection to said one member, a small aperture provided in the normally closed end of said bush boots to vent the interior volume of said bush boots between the free ends of said pins and the normally closed end of said bush boots directly to the exterior atmosphere and said apertures being normally closed by the elasticity of said bush boots to prevent entry therethrough of foreign matter into the interior volume of said bush boots.

2. A sliding caliper bype disc brake as claimed in claim 1 which is characterized in that said penetrating guide holes are in said torque member with said bush boots seated therein.

3. A sliding caliper type disc brake as claimed in claim 2, which is characterized in that said guide pins are threadably secured to said caliper member.

4. A sliding caliper type disc brake as claimed in claim 1 which is characterized by integral stop flanges on opposite ends of said bush boots preventing sliding of said bush boots relative to said guide holes in which they are seated.

5. A sliding caliper type disc brake as claimed in claim 1 which is characterized in that said friction pads positioned on both sides of said disc respectively are supported slidably in the axial direction of said disc by said torque receiving parts with which they are coupled respectively, so as to prevent them from moving in a radial direction of said disc.

6. A sliding caliper type disc brake as claimed in claim 5, which is characterized in that the torque receiving parts are slidably coupled with grooves on opposite sides of backing plates for said friction pads.

7. A sliding caliper type disc brake as claimed in claim 5, which is characterized in that said torque receiving parts define a first space therebetween having a distance C to receive a corresponding first pair of side ears of at least one of the pads, said first pair of side ears are located on the radial inward side of said at least one pad with respect to the disc, said torque receiving parts define a second space therebetween having a distance A which is larger than said distance C to receive a second pair of side ears of said at least one pad which are located on the radial outward side thereof with respect to the disc such that said at least one pad cannot be inadvertently inserted upside down.

8. A sliding caliper type disc brake as claimed in claim 1, which is characterized in that a pad retainer made of an elastic plate is interposed between said friction pads and said caliper member.

9. A sliding caliper type disc brake as claimed in claim 8, which is characterized in that an end part extending from said pad retainer is received in a clearance groove for said brake disc which is provided on the inner side of a U-shaped arm of said torque member.

10. A sliding caliper type disc brake as claimed in claim 9, which is characterized in that said pad retainer is an elastic plate in the shape of a cross with one cross end thereof providing said end part which couples with said torque member, the cross end of said plate opposite said end part coupling with said caliper member and the remaining opposite cross ends of said plate providing a wing part which extends at about a right angle to the direction of extension of the first-mentioned opposite cross ends and engages and retains said pads within said torque member.

11. A sliding caliper type disc brake as claimed in claim 10, which is characterized in that portions of said wing part elastically press against at least one of said friction pads.

12. A sliding caliper type disc brake as claimed in claim 9, which is characterized in that said pad retainer is positioned to gauge the friction wear limit of said friction pads.

* * * * *